(12) United States Patent
Tineo

(10) Patent No.: US 11,093,620 B2
(45) Date of Patent: Aug. 17, 2021

(54) AHEAD OF TIME APPLICATION LAUNCHING FOR CYBERSECURITY THREAT INTELLIGENCE OF NETWORK SECURITY EVENTS

(71) Applicant: ThreatConnect, Inc., Arlington, VA (US)

(72) Inventor: Danny Tineo, Charlotte, NC (US)

(73) Assignee: ThreatConnect, Inc., Arlington, VA (US)

( * ) Notice: Subject to any disclaimer, the term of this patent is extended or adjusted under 35 U.S.C. 154(b) by 211 days.

(21) Appl. No.: 16/178,946

(22) Filed: Nov. 2, 2018

(65) Prior Publication Data

US 2020/0143060 A1 May 7, 2020

(51) Int. Cl.
| | |
|---|---|
| *H04L 29/06* | (2006.01) |
| *G06F 21/57* | (2013.01) |
| *G06F 21/62* | (2013.01) |
| *G06F 9/54* | (2006.01) |
| *G06F 9/445* | (2018.01) |
| *G06F 21/51* | (2013.01) |

(52) U.S. Cl.
CPC .......... *G06F 21/577* (2013.01); *G06F 9/445* (2013.01); *G06F 9/542* (2013.01); *G06F 21/51* (2013.01); *G06F 21/629* (2013.01)

(58) Field of Classification Search
CPC ...... G06F 21/57; G06F 21/577; G06F 21/629; G06F 9/542; G06F 9/445; G06F 21/51; G06F 9/4887; G06F 2221/033; G06F 21/554
See application file for complete search history.

(56) References Cited

U.S. PATENT DOCUMENTS

| | | | |
|---|---|---|---|
| 8,090,797 B2 * | 1/2012 | Chinta | G06F 21/53 709/217 |
| 8,776,241 B2 | 7/2014 | Zaitsev | |
| 9,508,040 B2 | 11/2016 | Bilal et al. | |

(Continued)

OTHER PUBLICATIONS

M. Shashanka, M. Shen and J. Wang, "User and entity behavior analytics for enterprise security," 2016 IEEE International Conference on Big Data (Big Data), Washington, DC, 2016, pp. 1867-1874.

(Continued)

*Primary Examiner* — Taghi T Arani
*Assistant Examiner* — Lin Chang
(74) *Attorney, Agent, or Firm* — Faegre Drinker Biddle & Reath LLP

(57) ABSTRACT

Systems, methods, and computer-readable storage devices are disclosed for improve cybersecurity intelligence by launching applications ahead of time. One method including: receiving, over a communications network, at least one threat model; determining whether a performance of an orchestrated response is triggered based on the at least one threat model, wherein the orchestrated response includes a plurality of applications to be executed in a predetermined sequence; and launching, when the performance of the orchestrated response is triggered, a first application and a second application of the plurality of applications of the orchestrated response, wherein the second application executes after execution of the first application has completed execution.

20 Claims, 16 Drawing Sheets

(56) References Cited

U.S. PATENT DOCUMENTS

| | | | |
|---|---|---|---|
| 9,565,204 B2 | 2/2017 | Chesla | |
| 9,838,417 B1* | 12/2017 | Khalid | G06F 9/45533 |
| 2007/0033631 A1* | 2/2007 | Gordon | H04N 21/4307 |
| | | | 725/132 |
| 2007/0033651 A1* | 2/2007 | Imanishi | H04N 21/8166 |
| | | | 726/26 |
| 2007/0135936 A1* | 6/2007 | Dumas | G06Q 10/06 |
| | | | 700/29 |
| 2007/0162890 A1 | 7/2007 | Meier et al. | |
| 2007/0300218 A1* | 12/2007 | Mann | G06F 9/4843 |
| | | | 718/1 |
| 2008/0168529 A1 | 7/2008 | Anderson et al. | |
| 2013/0219404 A1* | 8/2013 | Yang | G06F 9/4881 |
| | | | 718/104 |
| 2013/0246511 A1 | 9/2013 | Brown et al. | |
| 2015/0033341 A1 | 1/2015 | Schmidtler et al. | |
| 2015/0106825 A1* | 4/2015 | Abbas | G06F 9/546 |
| | | | 719/318 |
| 2015/0288712 A1* | 10/2015 | Jones | G06F 21/577 |
| | | | 726/25 |
| 2016/0021056 A1* | 1/2016 | Chesla | H04L 63/14 |
| | | | 726/11 |
| 2016/0092283 A1* | 3/2016 | Maes | G06F 9/546 |
| | | | 719/313 |
| 2017/0289191 A1* | 10/2017 | Thioux | H04L 63/1441 |
| 2018/0060132 A1 | 3/2018 | Maru et al. | |
| 2018/0300170 A1* | 10/2018 | Basu | G06F 9/485 |

OTHER PUBLICATIONS

Korean Intellectual Property Office, International Search Report and Written Opinion for International Application No. PCT/US2019/059656, dated Apr. 8, 2020.

* cited by examiner

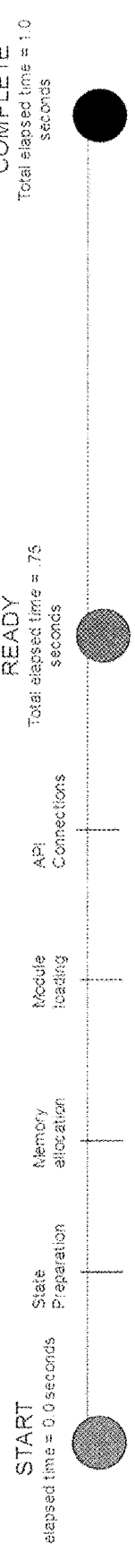

AHEAD OF TIME APPLICATION LAUNCHING FOR CYBERSECURITY THREAT INTELLIGENCE OF NETWORK SECURITY EVENTS

INTRODUCTION

Conventionally, networks utilize Security Information and Event Management (SIEM) systems that provide analysis of security alerts to be used by end user network security analysts. The alerts may be provided in response to a cybersecurity threat or event such as a ransomware attack, code exploit, distributed denial of service attack, malware, and the like. These SIEM systems can gather and store this security alert information in historical logs that may be used to track security events and determine trends. Nevertheless, while these conventional SIEM systems can be effective in generating alerts and identifying risks, they require network security analysts to determine an appropriate security action in response to such alerts. Further, these alerts may not be sufficient for a network security analyst to take an appropriate response, and the analyst may be required to investigate further the alert by obtaining and examining cybersecurity threat intelligence data from other sources.

Threat intelligence can refer to evidence-based knowledge, including context, mechanisms, indicators, implications, and actionable advice, about an existing or emerging menace or hazard to assets that can be used to inform decisions regarding the subject's response to that menace or hazard. Threat data can refer to a list of malicious domains, a file hash, websites, Internet Protocol (IP) addresses, and other indicators of compromise (IOCs). However, without an understanding of context, relevance, accuracy, or known association, the meaning of a single indicator or data point is difficult to obtain, and it is unlikely that an appropriate response or next action can be mounted in response to a potential threat event. In view of the growing number of cybersecurity events, the rapidity by which such events can produce deleterious effects on a network, and the limited number of qualified network security analysts, the time for adequately responding to security events on the network using such conventional SIEM systems is slowing to the point where network security could be compromised.

Further, in view of the growing number of cybersecurity events, a particular network's security plan may include a response for a particular threat type and value. However, due to the growing number, it may be advantageous to optimize execution of various applications of the particular network's security plan to maximize hardware utilization and/or reduce response time.

SUMMARY OF THE DISCLOSURE

According to certain embodiments, systems, methods, and computer-readable media are disclosed for improved cybersecurity intelligence by launching applications ahead of time ("AOT").

In conventional system for responding to a cybersecurity event, a first application will process the threat and then send the result to a subsequent application for further processing. Many such conventional systems may include one or more subsequent applications depending on the result of the first application. These subsequent application may be configured as a decision tree as shown in FIGS. 9A and 9B and the cybersecurity event could be processed by three of more application in series. But, each of the subsequent applications will not launch until receiving an input from a prior application, and the time for initializing the subsequent application may even exceed the processing time of a cybersecurity event by a particular application. Given the scale of processing cybersecurity events, much of the time may be spent launching applications rather than processing a suitable response in a timely manner. Accordingly, it would be advantageous by reducing any wait time for launching a particular options such that the system uses its processing resources for responding to a cybersecurity event. By utilizing AOT functionality for launching applications downstream in the decision tree, the system may greatly reduce processing time and increase the capacity for responding to cybersecurity threats. When the downstream applications are launched AOT, the output of a preceding application may be immediately processed by a subsequent application without waiting for the subsequent application to launch.

According to certain embodiments, a system for improved cybersecurity intelligence by launching applications ahead of time is disclosed. One system including: a non-transitory memory configured to store at least threat model data; and one or more hardware processors coupled to the non-transitory memory and configured to read instructions from the non-transitory memory to cause the system to perform operations comprising: receiving, over a communications network, at least one threat model; determining whether a performance of an orchestrated response is triggered based on the at least one threat model, wherein the orchestrated response includes a plurality of applications to be executed in a predetermined sequence; and launching, when the performance of the orchestrated response is triggered, a first application and a second application of the plurality of applications of the orchestrated response, wherein the second application executes after execution of the first application has completed execution.

According to certain embodiments, a computer-implemented method for improved cybersecurity intelligence by launching applications ahead of time is disclosed. One method including: receiving, over a communications network, at least one threat model; determining whether a performance of an orchestrated response is triggered based on the at least one threat model, wherein the orchestrated response includes a plurality of applications to be executed in a predetermined sequence; and launching, when the performance of the orchestrated response is triggered, a first application and a second application of the plurality of applications of the orchestrated response, wherein the second application executes after execution of the first application has completed execution.

According to certain embodiments, a computer-readable storage device storing instructions that, when executed by a computer, cause the computer to perform a method for improved cybersecurity intelligence by launching applications ahead of time is disclosed. One method of the computer-readable storage devices including: receiving, over a communications network, at least one threat model; determining whether a performance of an orchestrated response is triggered based on the at least one threat model, wherein the orchestrated response includes a plurality of applications to be executed in a predetermined sequence; and launching, when the performance of the orchestrated response is triggered, a first application and a second application of the plurality of applications of the orchestrated response, wherein the second application executes after execution of the first application has completed execution.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. For example, one of ordinary skill in the art will recognize that the optimization of any multiple-level processing based on automated decision making via a decision tree may be achieved through the AOT functionality disclosed herein and the invention is not limited to the execution of applications in response to a cybersecurity event.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIGS. 7A and 7B are example execution times of applications of a Playbook state machine, according to implementations disclosed herein.

DETAILED DESCRIPTION OF THE EMBODIMENTS

Figure 1:
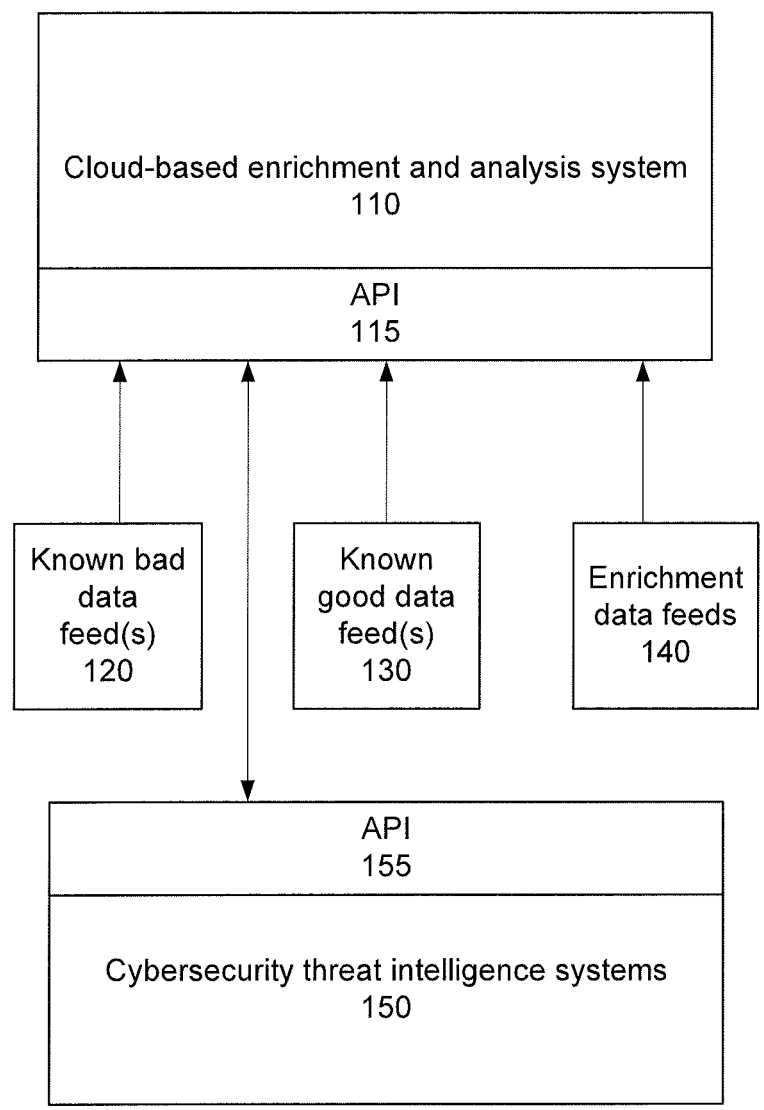
FIG. 1 is an example architecture for a system according to the implementations disclosed herein.

One skilled in the art will recognize that various implementations and embodiments of the present disclosure may be practiced in accordance with the specification. All of these implementations and embodiments are intended to be included within the scope of the present disclosure.

As used herein, the terms "comprises," "comprising," "have," "having," "include," "including," or any other variation thereof, are intended to cover a non-exclusive inclusion, such that a process, method, article, or apparatus that comprises a list of elements does not include only those elements, but may include other elements not expressly listed or inherent to such process, method, article, or apparatus. The term "exemplary" is used in the sense of "example," rather than "ideal."

For the sake of brevity, conventional techniques related to data transmission, detection systems, server systems, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative and/or additional functional relationships or physical connections may be present in an embodiment of the subject matter.

Reference will now be made in detail to the exemplary embodiments of the disclosure, examples of which are illustrated in the accompanying drawings. Wherever possible, the same reference numbers will be used throughout the drawings to refer to the same or like parts.

Based upon the discussion herein, it may be advantageous to orchestrate a response to a security event when possible to free up qualified network security analysts for higher priority tasks related to previously unknown cybersecurity threats and improve overall response time to cybersecurity events. Orchestrating a response to a cybersecurity threat constitutes a transformation of key data associated with a threat into an effective action by processing the data in a way that generates a response according to predetermined parameters. One such approach is collecting a plurality of threat models, and storing the plurality of threat models for later use in scoring and classifying future threat models. The collected threat models may also be integrated and/or analyzed with other data feeds from external for analyzing and responding to new cybersecurity threats. Accordingly, it is desirable to provide a novel enrichment and analysis of cybersecurity threat intelligence system, which may be cloud-based, that accounts for and augments threat models based prior threat models and external sources. A threat model may be generated from a process that assesses a risk of a cybersecurity threat. The process may include (1) an indication of what is included/excluded from the analysis (e.g., scope), (2) collection of detailed data about real cyber incidents (e.g., malicious URLs, phishing attempts, etc.), (3) a risk assessment as to whether the existing defenses are sufficient to mitigate or prevent the threat and/or to what extent are users/systems vulnerable to the threat, and (4) an action may be undertaken to detect and/or mitigate the threat as assessed by parts 1-3 of the process.

Disclosed are techniques which can include a system for cloud-based enrichment and analysis of cybersecurity threat intelligence. In an implementation, the system may assimilate, correlate, and/or assess various threat models and/or other data feeds to generate an aggregated understanding of one or more IOCs in a threat model, including, for example a threat rating, a confidence rating, and/or a context of the threat being assessed. The system may provide users with an understanding of an indicator's general reputation, specific risk to the organization of the user, and/or a relation to current or past threats. A user may refer to cybersecurity experts such as a network engineer or the like, who may oversee or manage security of a network and/or computing systems connected thereto, as well as an analyst, leadership, and management in fields such as Threat Intelligence, Incident Response, Risk Management, etc.

The system may collect individual instances of threat models, and provide such threat models based on cross-instance observations and false positive reporting from other threat models The system may be configured to store reputation data from multiple "data services" to be brokered to each threat model instance. This may improve efficiency of collection and storage, and may create a centralized repository for all observation, false positive data, external reputation data, and whitelist data from all threat model instances. The centralized data may also be used for analytics for input and/or definition of a reputation score.

The system may provide the capability and associated infrastructure for a "Universal Whitelist" and may enable many other analytics for cross-instance delivery in the future. The system may, for example, aggregate observations and false positive ratios by the cybersecurity industry and/or other organizations.

For each threat, such as an IOC, a threat model may be generated, and actionable intelligence of the threat model may be enriched with a reputation, including good and/or bad data points, and background data. The reputation of the threat and background information of the threat, such as WHOIS data, a DNS history, may enable analysts to prioritize other threats and incidents related to the threat being analyzed.

The consolidation of cybersecurity intelligence data may provide a significant advantage to cybersecurity threat models. The consolidated data may be vetted by different customers and/or users of the system and may provide more useful and more relevant information about the threat. The above and below described centralized platform may also be scaled for long term, high volume storage needs. Customers and users of the platform may also benefit by being able to see information that was previously unknown or inaccessible. This can improve the quality of a threat model, which provides an opportunity to orchestrate an appropriate cybersecurity response based on predetermined parameters, thereby reducing the need for analyst and improving response time. For example, the disclosed system may output a reputation score which can be used to deliver an appropriate response automatically.

Search/query/view metrics may be used on the analyzed data to gauge customer/user interactions with the platform and may provide data driven decisions. Users may use these metrics to study the data to develop more detailed data points. These metrics may then be analyzed by the platform to provide even more contextual data. Further, customer/user feedback in terms of observations, confirmation/disputation, and social like/unlike may add another dimension to the analyzed data. For example, in some configurations, a machine learning algorithm or classifier may be applied to threat data and/or metrics.

Cloud-Based Enrichment and Analysis System

FIG. 1 is an example architecture for a system according to the implementations disclosed herein. As shown in FIG. 1, a cloud-based enrichment and analysis system 110 may be operably connected to an application program interface (API) for the cloud 115. An API may refer to a set of routines, protocols, and/or tools for a software application. An API may specify how software components may interact. The cloud system 110 may receive, via the cloud API 115, known bad data feeds 120 from external data sources, known good data feeds 130 from external data sources, and enrichment data feeds 140 from external data sources.

A data feed may refer to receipt of data from a source by which the data can be updated in real-time. Known bad data feeds 120 may include, for example, a blacklist and/or a malicious uniform resource locator (URL) data feed. For example, a known bad data feed may be published online and provide a targeted collection of known malicious sites. Such known bad data feeds may be added via partnerships with other cybersecurity organizations, discovered via open source research, etc. Known good data feeds 130 and enrichment data feeds 140 may include, for example, a whitelist, Google's safe browsing site status list, and/or Alexa's top 1000 global sites list. Known good data feeds may be published online and provide a targeted collection of known benign indicators. The cloud-based enrichment and analysis system 110 may receive, via the API 115, threat models from one or more cybersecurity threat intelligence system 150, which is operably connected to its own API 155.

The cybersecurity threat intelligence system may provide a user with analytics regarding one or more threat models, data from the data feeds, data pertaining to IOCs, current and/or previous trigger events, an indication of threats for the user's organization, an interface for a user to configure an orchestrated response to one or more threats, an indication of attack patterns of cybersecurity threats, etc. The API 155 of the cybersecurity threat intelligence system may also receive the known bad data feeds 120 received by the cloud-based enrichment and analysis system. The cloud-based enrichment and analysis system 110 may, for example, transmit a reputation score, for example, to the cybersecurity threat intelligence system 150, as a part of a threat model.

In some configurations, a reputation score may provide a basis for the orchestrated response. For example, in the event that the reputation score is a above a certain threshold or in a predetermined range, it may generate an alert for an analyst (e.g., an email, text, automated telephone message, etc.) that the threat requires the analyst's attention. A Playbook that corresponds to the orchestrated response may pause in such instances. In some instances, the reputation score may be within a specified range for which the system may be configured to automatically take action(s) corresponding to the orchestrated response for handling threats.

Playbook

It may be advantageous to orchestrate a response to a security threat when possible to allow a network security analyst to concentrate on higher priority tasks related to previously unknown cybersecurity threats, and improve overall response time to such threats. As disclosed herein, a threat "Playbook" may be used. The Playbook may codify a particular network's security plan and automatically set a given response for a particular threat type and value. The Playbook can also integrate a number of applications for analyzing and responding to cybersecurity threats. A Playbook can be limited where (1) it does not have appropriate access to a wide array of threat intelligence sources, and (2) it has an inability to respond to alerts that are unknown, requiring the intervention of a network security analyst. The latter deficiency can be particularly damaging for "zero day" attacks that are undocumented in other threat intelligence sources. Accordingly, it is desirable to provide a novel SIEM system that accounts for and augments a Playbook's capabilities.

By automating security responses and updates based upon the reputation score and/or other threat intelligence information provided/analyzed by the above system, the orchestrated process disclosed herein can leverage existing threat intelligence integrated with security products, while at the same time preserving the limited resources of expert network security analysts. This combination improves the response time to growing cybersecurity threats with the same resources and collects and stores data as new threats are validated to further improve security processes. For example, if only one threat intelligence source has data on a particular malicious host, all other sources integrated with the orchestrated process could be updated with the new threat to improve the overall cybersecurity response.

Figure 2:
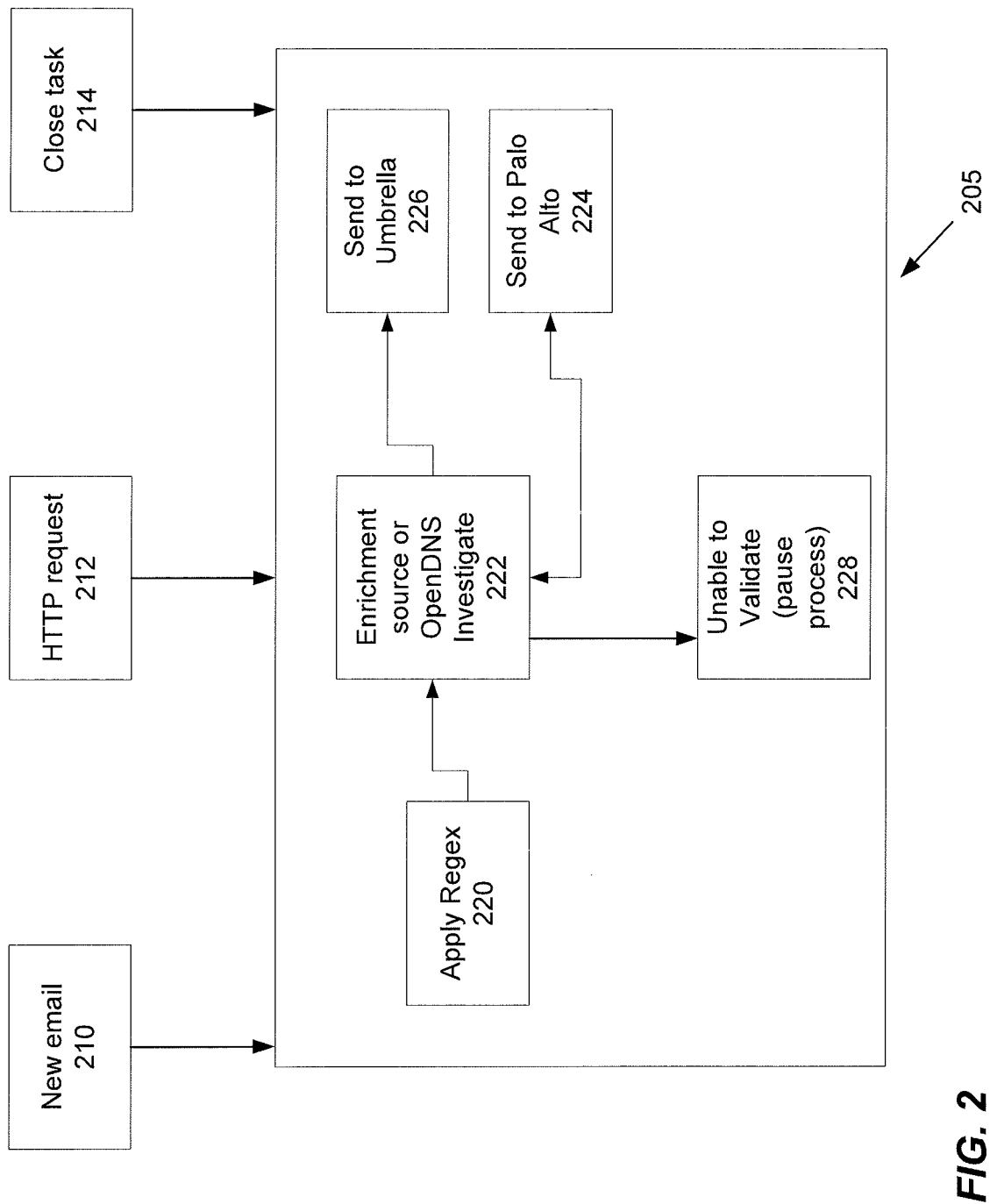
FIG. 2 illustrates an example overview of a schematic for orchestrating a response to a cybersecurity threat event as disclosed herein.

FIG. 2 illustrates an example overview of a schematic for orchestrating a response to a cybersecurity threat event as disclosed herein. A network administrator can configure the threat event that will trigger execution of the orchestrated cybersecurity response. Examples of a threat event can be a new email 210, an HTTP request 212, or closing a task 214. The orchestrated SIEM system 205 disclosed herein can include applying a RegEx ("Regular Expression") filter 220 to parse text and pull out identifying information from which a particular security threat may be assessed. In the case of email or an HTTP request 212, for example, domain or host names may be extracted for analysis. The extracted data can then be compared or analyzed using known repositories or sources of cybersecurity threat intelligence such as an enrichment source and/or OpenDNS Investigate 222 to determine whether the host is malicious or otherwise poses an unacceptable security risk. For example, a reputation score may be considered an enrichment source, and may provide an indication of whether an indicator is malicious. One or more such sources of intelligence regarding cybersecurity threats can be used in the orchestrated process.

If the host is confirmed or validated as a threat, for example based upon the reputation score computed as described earlier is within a range indicating that it is a confirmed threat and/or OpenDNS Investigate, the orchestrated process can automatically send the host to a number of security defense applications according to the desired Playbook, such as a firewall or security-service that pushes out a security update to all devices in the network regarding the threat. Examples of such defense applications are firewalls from Palo Alto Networks 224 and the cloud-based network security service such as Umbrella or the like 226 from OpenDNS. The validation of a threat can also be used to update sources of intelligence regarding cybersecurity threats to make the orchestrated process more efficient and improve automated responses to cybersecurity threats.

If the enrichment source and/or OpenDNS Investigate 222 or other threat intelligence product cannot validate 228 the threat, the orchestrated process is paused so that a network security analyst can assess the threat independently. The system may, for example, send an alert or notice (e.g., an email, text, etc.) to the analyst. If the analyst validates the threat, the host may then be processed in the same orchestrated manner by updating threat intelligence sources and implementing the security response as is done when the threat is automatically determined based on prior threat intelligence. Previously, analysts may have been informed about unknown hosts with an alert or email creating a task order. But in the previous conventional SIEM systems, the task was no longer within the response process of the SIEM system and the determination could not be seamlessly integrated into the network defense application. As disclosed herein, the network security analyst's validation of a cybersecurity threat may be processed according to the Playbook and cause an automated or orchestrated network security response.

Figure 3:
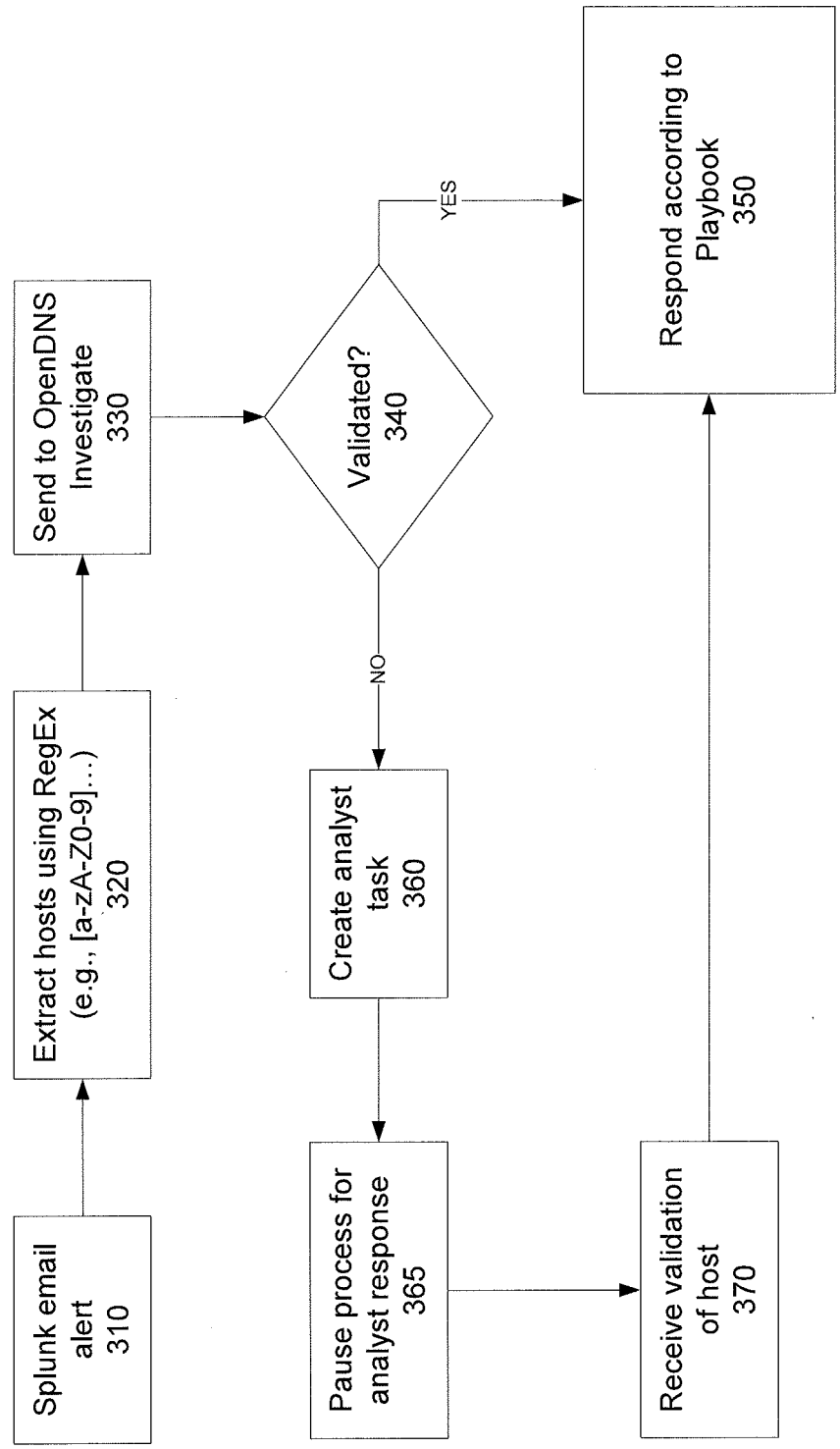
FIG. 3 illustrates an example of the orchestrated process according to a Playbook when the execution trigger is sending an email, according to implementations disclosed herein.

FIG. 3 illustrates an example of the orchestrated process according to a Playbook when the execution trigger is sending an email, according to implementations disclosed herein. In this example, Splunk 310 may be configured to send an alert of a new email to the SIEM, and the hosts embedded in the email can be extracted using a RegEx filter at 320. These hosts may be sent to a threat intelligence product at 330 (e.g., OpenDNS Investigate). If the threat intelligence product validates the host as malicious or otherwise a threat at 340, a security response may be automatically implemented at 350. If the threat intelligence product cannot validate the host at 340, an analyst task may be created at 360, and the orchestration process may be paused at 365 until an analyst can validate the threat. Once an analyst validates a threat at 370, for example the system receives an indication that the threat is validated, the orchestrated process may resume for an automated response according to the Playbook at 350. The orchestrated response, or Playbook, may be configurable via a user interface that is displayed to the user when the user is logged into the disclosed system. The user interface may permit dynamic configuration of the orchestrated process according to different trigger events and different criteria. The user interface, for example, may appear similar to the decision tree example illustrated in FIG. 3.

By automatic security responses and updates, the orchestrated process disclosed herein leverages existing threat intelligence integrated with security products, while at the same time preserving the limited resources of expert network security analysts. This combination improves the response time to growing cybersecurity threats with the same resources and collects and stores data as new threats are validated to further improve security processes. For example, if only one threat intelligence source has data on a particular malicious host, all other sources integrated with the orchestrated process could be updated with the new threat to improve the overall cybersecurity response.

Figure 4:
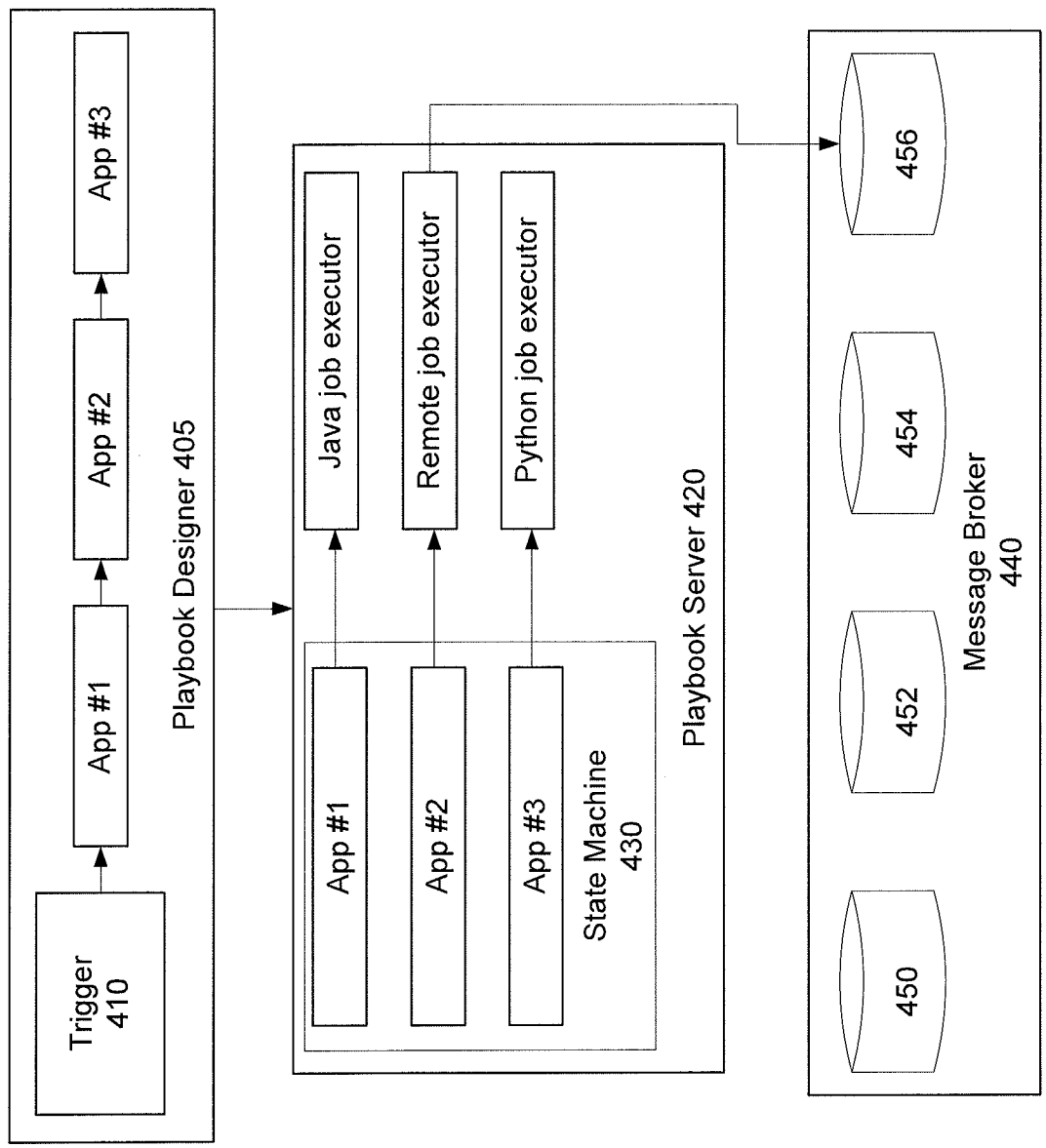
FIG. 4 is an example overview of the server architecture upon which the system may be implemented.

FIG. 4 is an example overview of the server architecture upon which the system may be implemented. A Playbook designer application 405 may be utilized to establish the applications (e.g., Apps #1 through #3) to execute in response to a trigger 410 as a part of an orchestrated response. A state machine 430 may have the three applications that form the response to the trigger stored on the Playbook server 420. Each application may be executed for different programming environments (e.g., Java, python, etc.). The message broker 440 may indicate the available environments 450, 452, 454, 456, and the indicated application may be delivered to a specific environment 456 that is serving a particular user or network.

For example, as a Playbook executes, and different applications associated with the Playbook execute, a user may desire to execute specific applications, such as a block action that must be executed behind the user's firewall. Not every application may be a part of the block action. As an example, some of the applications may be a part of the logic or decision making with regard to whether or not to block a threat or trigger event. If it is determined to execute a block action, such action may be executed inside of an environment that has the ability to do so. The queues on the messages broker 440 may represent a place to queue up processes or applications for execution for an environment. This may allow user's network to become disconnected without losing actions or applications that need to be executed inside the environment. It can also improve scalability and availability.

Figure 5:
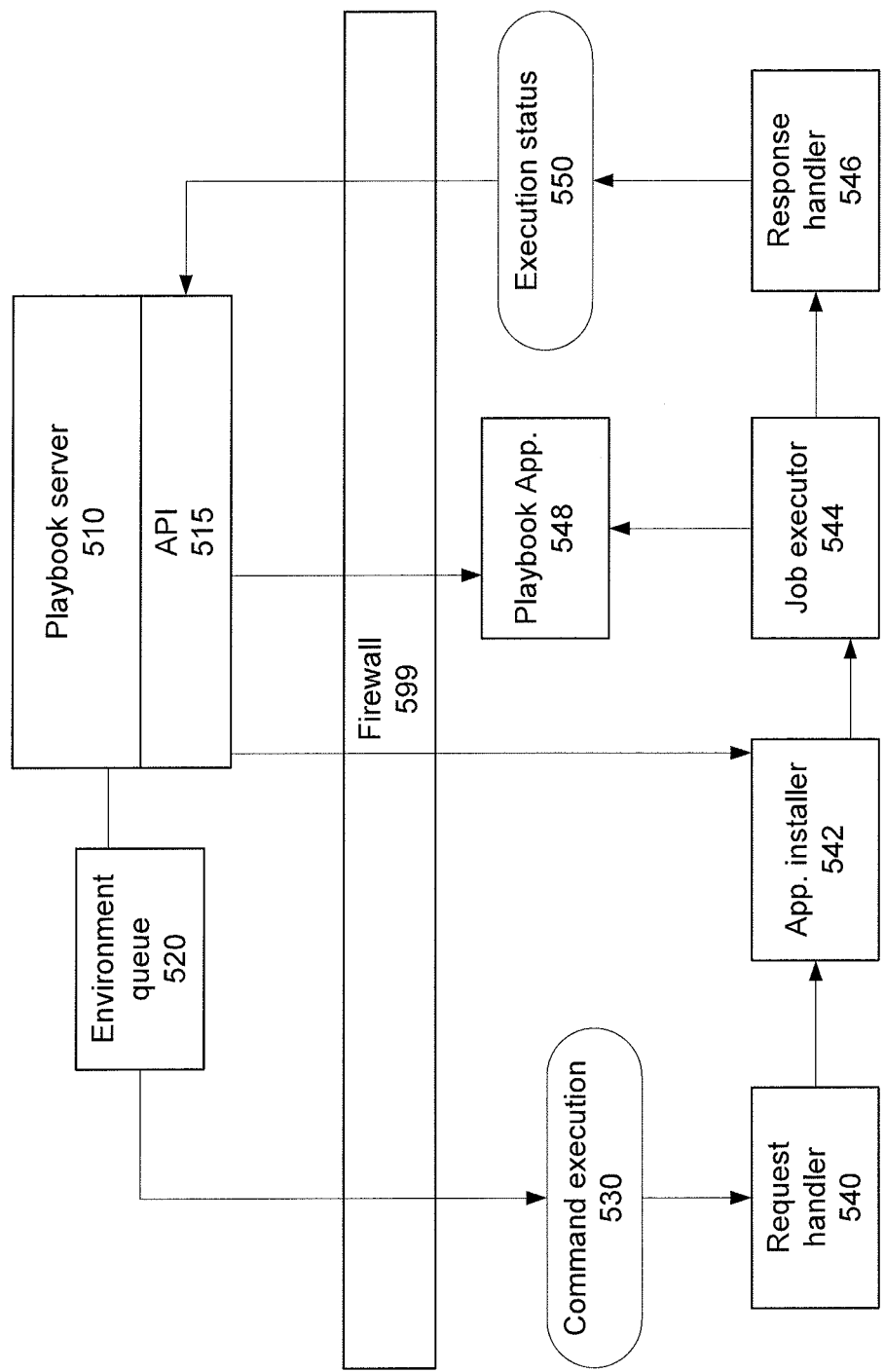
FIG. 5 is an example implementation of the relay execution lifecycle between a block action and when the environment server sends out an execution status to the Playbook server.

FIG. 5 is an example implementation of the relay execution lifecycle between a block action and when the environment server sends out an execution status to the Playbook server. The Playbook server 510 may be operably connected to an API 515 as well as the environment queue 520. The environment queue 520 may store commands or applications for execution by a computer system inside a firewall 599. Command execution 530 may initiate the orchestrated response to a threat. The request handler 540 may analyze the action and determine whether it should execute, and if so, how it should execute. The application installer 542 may download and install an application that needs to be executed locally and that may not be currently installed or available. The application installer 542 may automatically request the application 548 directly from the Playbook server 510 via the API 515 and automatically install the application 548. The job executor 544 may refer to code that initiates that application 548 and monitors the application 548 while it is running. The response handler 546 may collect exit information about the application 548 such as completion data. The execution status 550 may refer to sending the status of the application 548 back to the Playbook server 510 so that it can be viewed on the server 510 by a user, for example.

Figure 6:
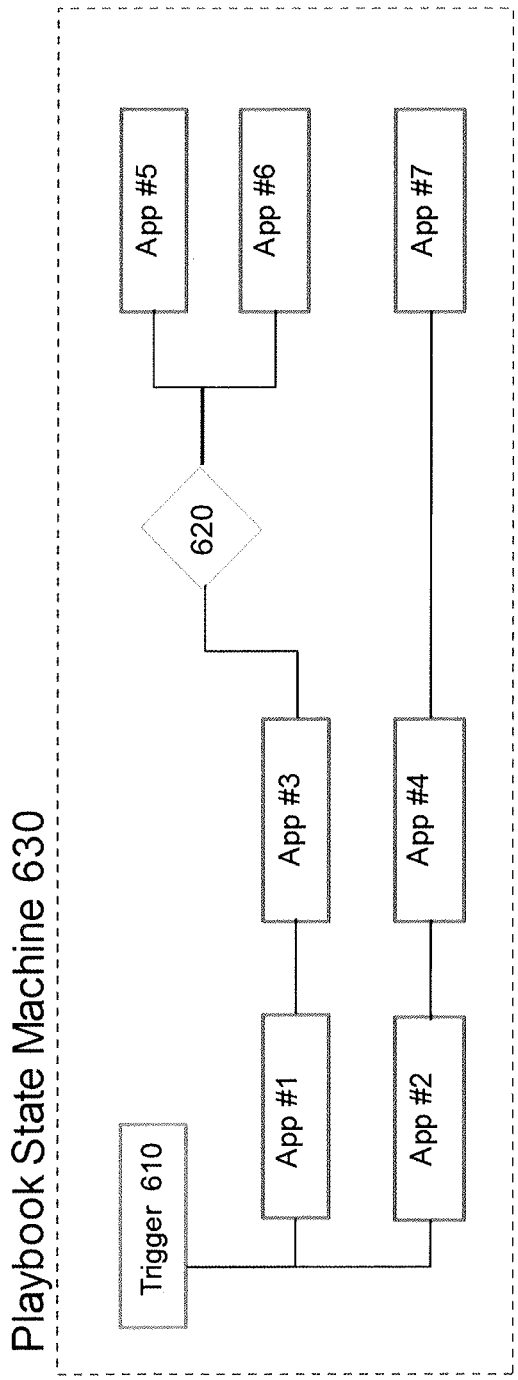
FIG. 6 is an example implementation of a Playbook state machine, according to implementations disclosed herein.

FIG. 6 is an example implementation of a Playbook state machine, according to implementations disclosed herein. As shown in FIG. 6, Playbook State Machine 630, upon Trigger 610, may execute App #1 through App #7 as needed. In Playbook State Machine 630, Apps #1 through App #7 may execute when the application is needed, also referred to as just-in-time ("JIT") launching. For example, upon Trigger 610, App #1 and App #2 may be launched and may be provided input. App #3 may wait until App #1 has completed to launch and may be provided input from App #1. Similarly, App #4 may wait until App #2 has completed to launch and may be provided input from App #2. Then, App #7 may wait until App #4 has completed to launch and may be provided input from App #4. Upon completion of App #3, only one of App #5 or App #6 may launch and may be provided input from App #3, as shown in FIG. 6. A decision 620 may be made upon completion of App #3 to determine which one of App #5 or App #6 may launch and which one of App #5 or App #6 may be provided input from App #3.

FIGS. 7A and 7B are example execution times of applications of a Playbook state machine, according to implementations disclosed herein. As shown in FIG. 7A, many playbook applications execute in 1.0 seconds to 1.5 seconds, of which, actual application logic may execute in 0.25 seconds to 0.75 seconds. Thus, up to 1.25 seconds of the execution time may be spent on application launch. Through the use of optimizations discussed herein, applications may have improved execution time, as shown in FIG. 7B. Further improvements may be realized by changing a Playbook state machine that launches applications just-in-time ("JIT") to a Playbook state machine that launches applications ahead-of-time ("AOT").

In embodiments of the present disclosure, a Playbook may include, for example, 15 applications. Each of these applications may have a 1.0 second launch penalty. Thus, there may be up to 15 seconds of launch penalties per Playbook execution. If, for example, a Playbook has 10,000 executions, there may be over 42 hours of launch penalties (i.e., 15 seconds*10,000 executions/(60 seconds per minute)/(60 minutes per hour)). With 4 concurrent executors, 42 hours may represent 10.5 hours of real clock time launch penalties for 10,000 executions.

According to embodiments of the present disclosure, Playbook applications may be launched before the application is need. In other words, Playbook applications may be launched ahead-of-time ("AOT"). Accordingly, Playbooks with 10 to 20 applications may have performance gains of up to, for example, 15 seconds. For a queue of 1,000 executions, more than 3 hours of processing may be saved, and for a queue of 10,000 executions, more than 31 hours of processing may be saved. However, launching applications ahead-of-time may not be as beneficial for Playbooks having very few applications.

Figure 8:
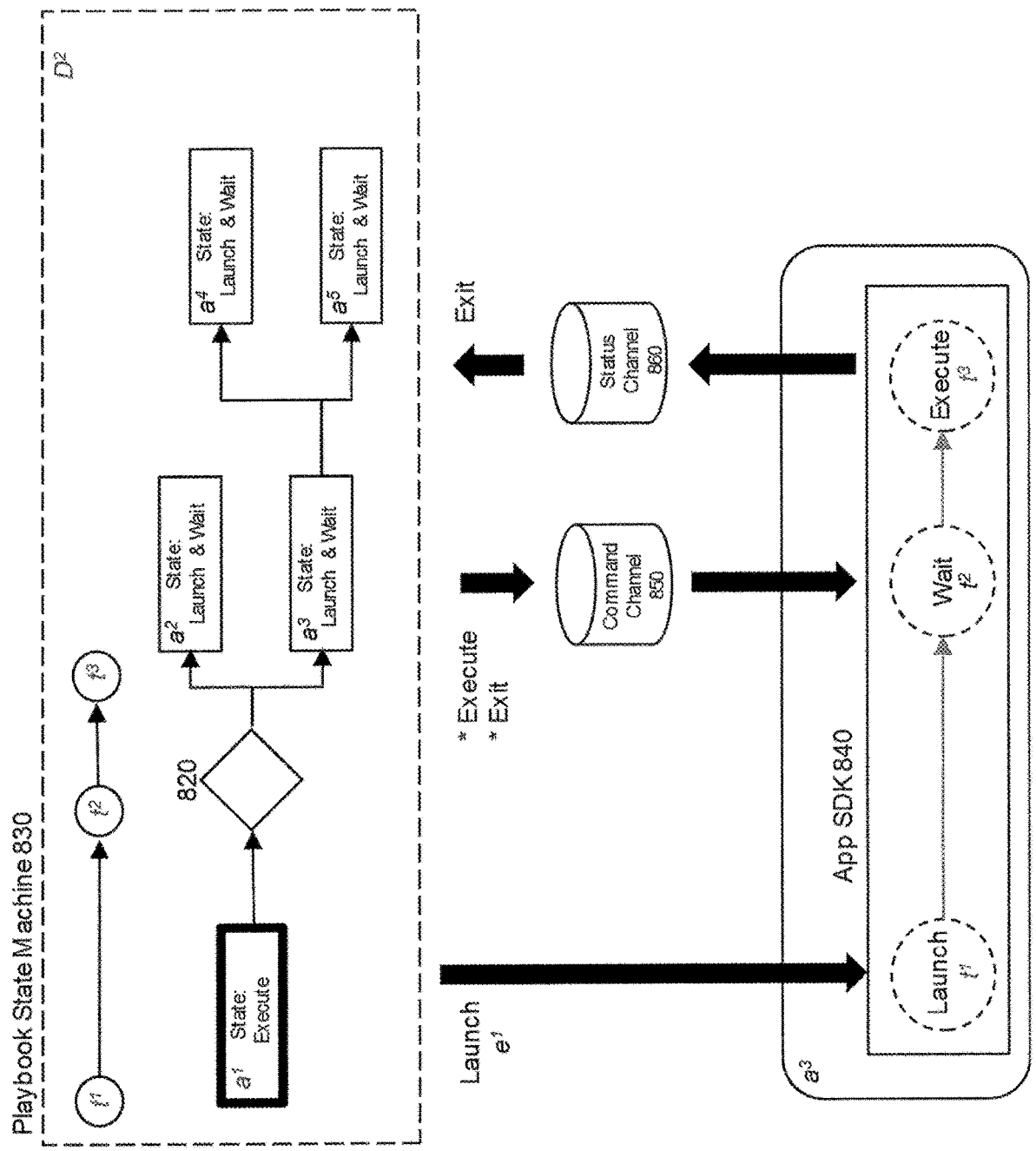
FIG. 8 is an example implementation of a Playbook state machine using ahead-of-time execution ("AOT"), according to implementations disclosed herein.

FIG. 8 is an example implementation of a Playbook state machine using AOT execution, according to implementations disclosed herein. As shown in FIG. 8, Playbook State Machine 830 at a given state machine time $t^n$, time "n" of a state machine sequence may have elapsed. Application process am may represent an application process "m" in a state machine sequence. $D^i$ may represent a predetermined depth level of "i" to control a predetermined number of levels of AOT activity in a state machine. $e^j$ may represent a time "j" to expire a wait phase if an execute message does not arrive.

In FIG. 8, $t^1$ may be a point when an application process is in a launch state, $t^2$ may be a point when the application process is in a wait state, and $t^3$ may be a point when the application process is in an execution state. For example, at a Playbook state machine time $t^1$, application process $a^1$ may be in an execution state, and application process $a^2$ through application process $a^5$ may be set to a launch state, and then, to a wait state to achieve ahead of time execution gains of time $t^2$ minus $t^1$.

Alternatively, application process $a^2$ through application process $a^5$ may avoid a launch delay of $t^2$ minus $t^1$ when the Playbook State Machine 830 sends launch commands to application processes that may require an execute command within a predetermined depth level D, such as $D^2$ (i.e., a predetermined depth level of 2) shown in FIG. 8. In Playbook State Machine 830, the Playbook state machine may be aware of which application processes may have AOT launching enabled. As shown in FIG. 8, when application process a' is in an execution state and when the predetermined depth level is 2, application process $a^2$ through application process $a^5$ may be set to a launch state, and then, to a wait state even though a decision 820 must be made to determine which of one of application process $a^2$ or application process $a^3$ may execution and may be provided input from application process $a^1$.

As shown in FIG. 8, application process $a^2$ through application process $a^5$ may remain in the wait state until a time $e^1$, which is within a predetermined window of time for the state machine sequence to arrive at a point where the application process can enter an execution state. If no execute message arrives on a command channel 850, an application process may expire after time $e^1$. Alternatively, Playbook State Machine 830 may receive an exit message on a status channel 860 to forcibly exit an application process when the Playbook State Machine 830 deems the application process as not needed as part of the Playbook state machine sequence.

As discussed above, if AOT execution is not enabled in a Playbook state machine, all application processes may consume time penalty $t^3$ minus $t'$ based on the application process sequence of the state machine. If AOT execution is enable in a Playbook state machine, parallel launching of application processes may reduce an overall state machine execution times by the sum $\Sigma$ ($t^2$ minus $t^1$) of all AOT enabled application process $a^2$ through application process $a^5$ launched.

As shown in FIG. 8, an application software development kit ("App SDK") 820 may manage AOT interaction between Playbook State Machine 830 and an application process. App SDK 840 may control a launch state and a wait state of an application process. An application process may be responsible for an execute state or a domain specific logic of the application process. A user of the App SDK 840 may not interact directly with a flow of AOT execution because interaction may be remote from the App SDK 840.

Figure 9A:
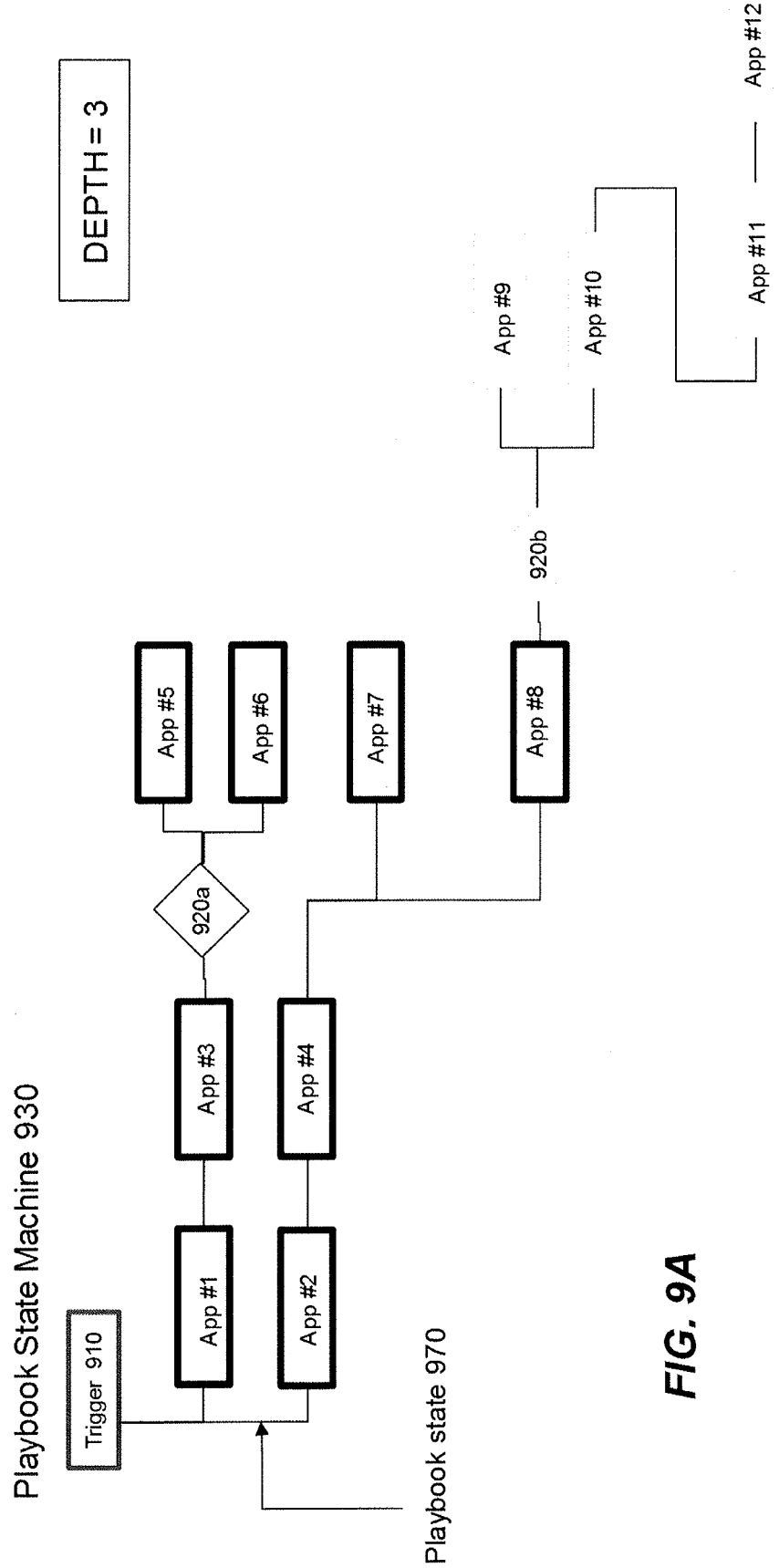
FIGS. 9A and 9B are example implementations of an in-execution Playbook state machine using ahead-of-time execution, according to implementations disclosed herein.
Figure 9B:
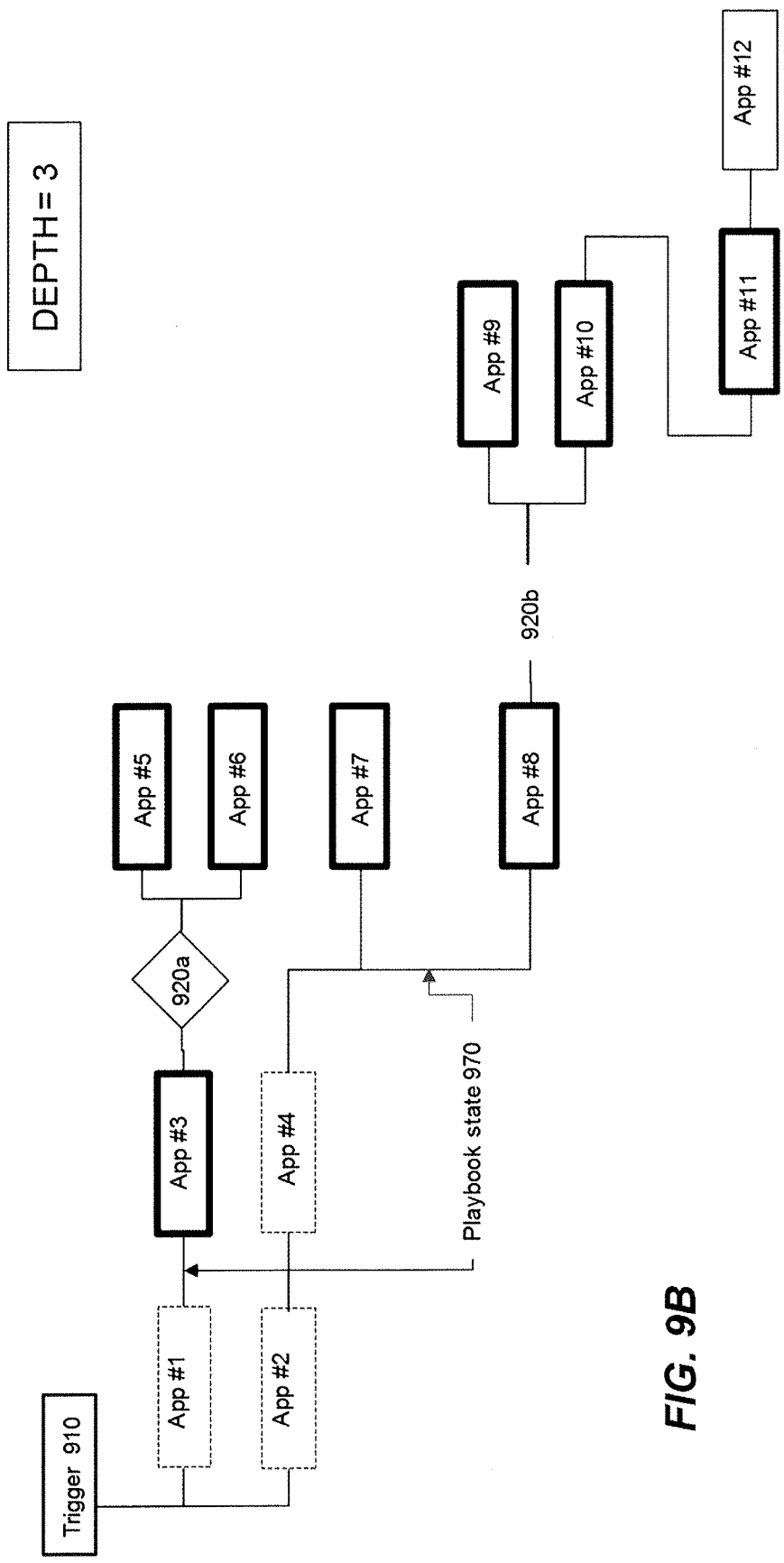

FIGS. 9A and 9B are example implementations of an in-execution Playbook state machine using AOT execution, according to implementations disclosed herein. As shown in FIG. 9A, Playbook State Machine 930, upon Trigger 910, may launch App #1 through App #8 concurrently at Playbook state 970, as a predetermined depth level of 3 is set in the Playbook State Machine 930. For example, if the predetermined depth level was set to 2, App #1 through App #4 may launch upon Trigger 910. Further, if the predetermined depth level was set to 4, App #1 through App #10 may launch upon Trigger 910.

As shown in FIGS. 9A and 9B, Playbook State Machine 930 may include six levels of depth, as App #12 must have 5 applications complete before execution (i.e., App #2, App #4, App #8, App #10, and App #11), and Playbook State Machine 930 may include decisions 920*a* and 920*b*. Upon completion of App #3, decision 920*a* may determine which of either App #5 or App #6 may execute. With AOT execution, Playbook State Machine 930 may launch both App #5 and App #6. However, only one of App #5 or App #6 may execute. Similarly, upon completion of App #8, decision 920*b* may determine which of either App #9 or App #10 may execute. With AOT execution, Playbook State Machine 930 may launch App #9, App #10, and App #11. In an AOT configuration, App #12 may be launched upon execution of App #10. Upon execution of either App #5 or App #6, Playbook State Machine 930 may terminate the non-executing application. Further, upon execution of either App #9 or App #10, Playbook State Machine 930 may terminate the non-executing application(s).

FIG. 9B, shows Playbook State Machine 930 at Playbook state 970, where App #1, App #2, and App #3 may have completed execution, and App #3 may be receiving input from App #1 to begin execution, and App #7 and App #8 may be receiving input from App #4 to begin execution. As shown in FIG. 9B, App #3 and App #5 through App #11 may be in a launch state, and then, in a wait state, and App #12 may have not launched.

As mentioned above, for Playbook state machines with AOT execution, the predetermined depth level may be configurable. If the predetermined depth level is too high, computing resources may be wasted. Conversely, if the predetermined depth level is too short, completed applications may catch up to launching applications, and thus, the Playbook state machine may have to wait for the application to finish launching. Accordingly, the predetermined depth level may be configured to not allow applications to catch up to non-launched applications and configured to not waste computing resources. In embodiments of the present disclosure, the predetermined depth level may be based on the predetermined applications for a Playbook that have been established to execute in response to a trigger as a part of an orchestrated response.

Figure 10:
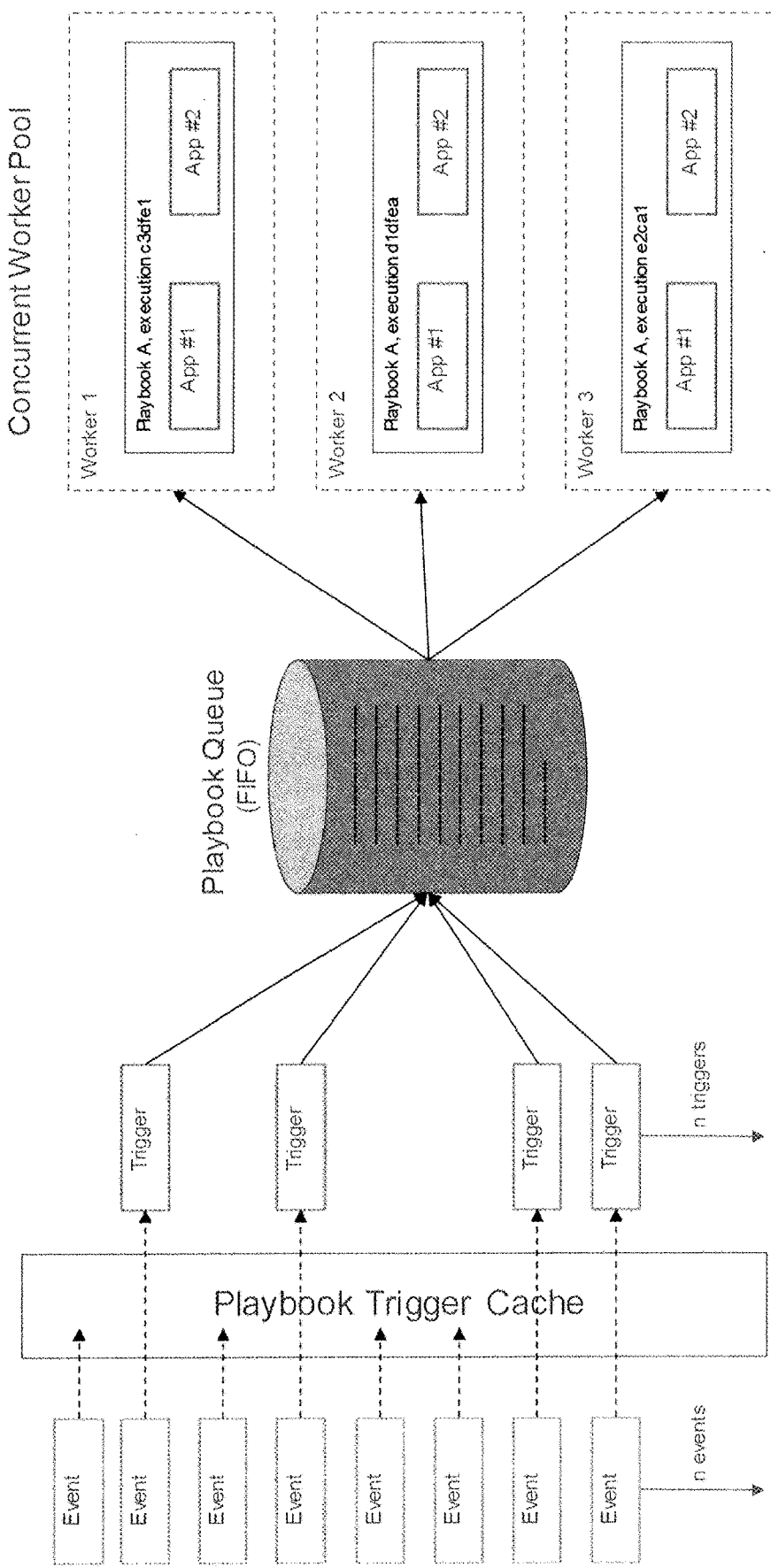
FIG. 10 is an example implementation of the relay execution lifecycle of Playbooks, according to implementations discloses herein.

FIG. 10 is an example implementation of the relay execution lifecycle of Playbooks, according to implementations discloses herein. As events occur that may cause a triggering of a Playbook, the triggered Playbook may be placed in a Playbook queue where Playbooks are operated on a first input, first output (FIFO) manner. Thus, each Playbook may be placed on an worker in a timely manner.

Figure 11:
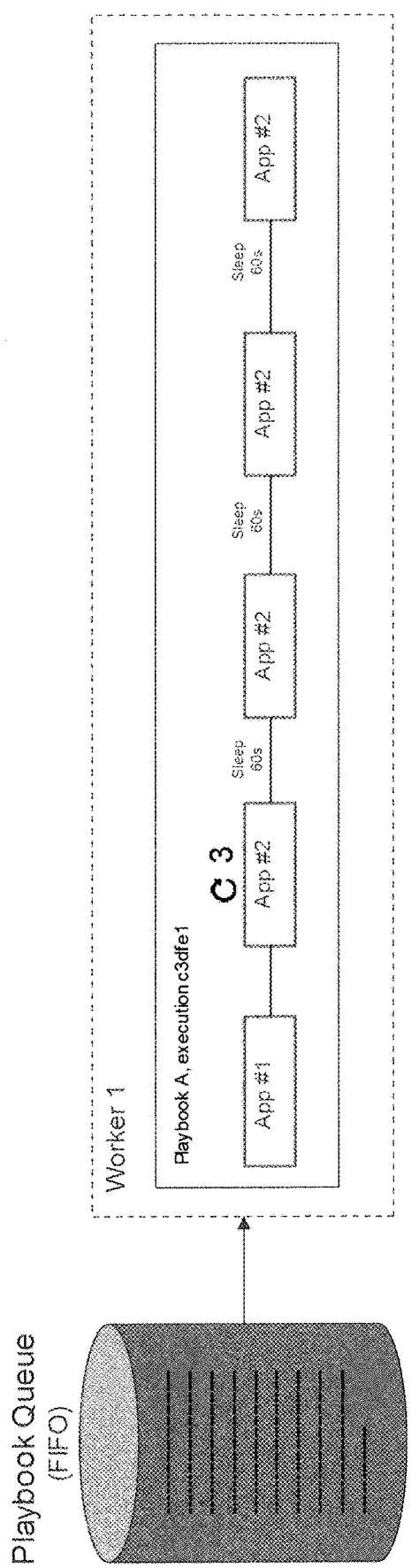
FIG. 11 is an example implementation of a worker of a Playbook for a duration of retries, according to implementations discloses herein.

FIG. 11 is an example implementation of a worker of a Playbook for a duration of retries, according to implementations discloses herein. As shown in FIG. 11, a worker may be blocked for a duration of retries, and a blocked time may equal a multiple of a number of retries and a time between retries. Similarly, a work may be blocked for a delay operator, and a blocked time may equal a time of delay and a time between the delay and execution. In exemplary embodiments, other Playbooks may not execute on a worker during delay operations and/or retries until it exits. Thus, a worker's resources may be wasted.

Figure 12:
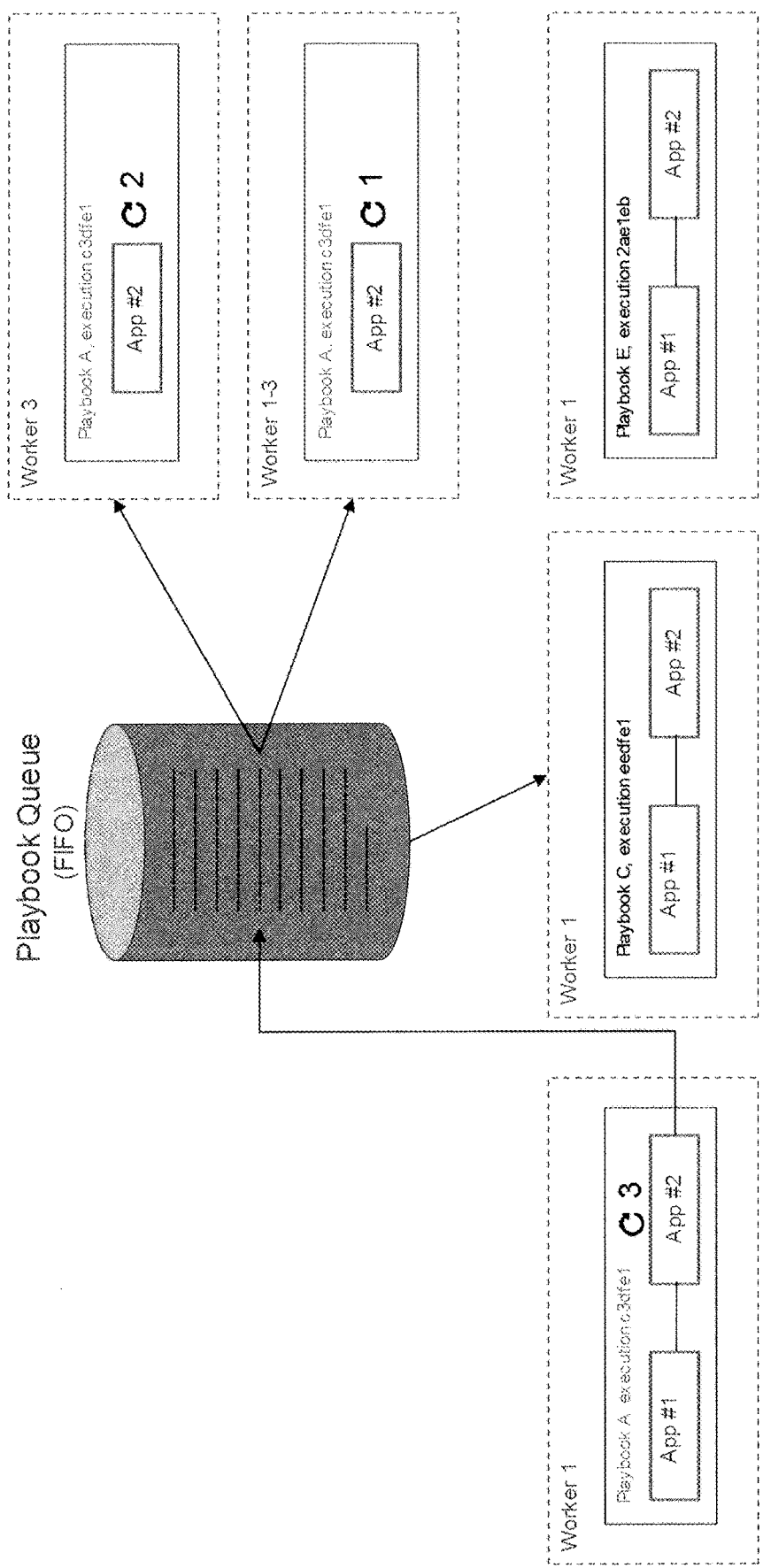
FIG. 12 is an example implementation of workers of a Playbook for a duration of retries, according to implementations discloses herein.

FIG. 12 depicts an example implementation of workers of a Playbook for a duration of retries, according to implementations discloses herein. As shown in FIG. 12, if a delay operation and/or retry operation is provided in a Playbook, then the Playbook may be placed back into a Playbook queue that operates on Playbooks in the first input, first output manner. Accordingly, the worker may be free to operate on other Playbooks, and the Playbook with the delay operation and/or retry operation may be acted on again after the Playbook is reached in the Playbook queue.

Figure 13:
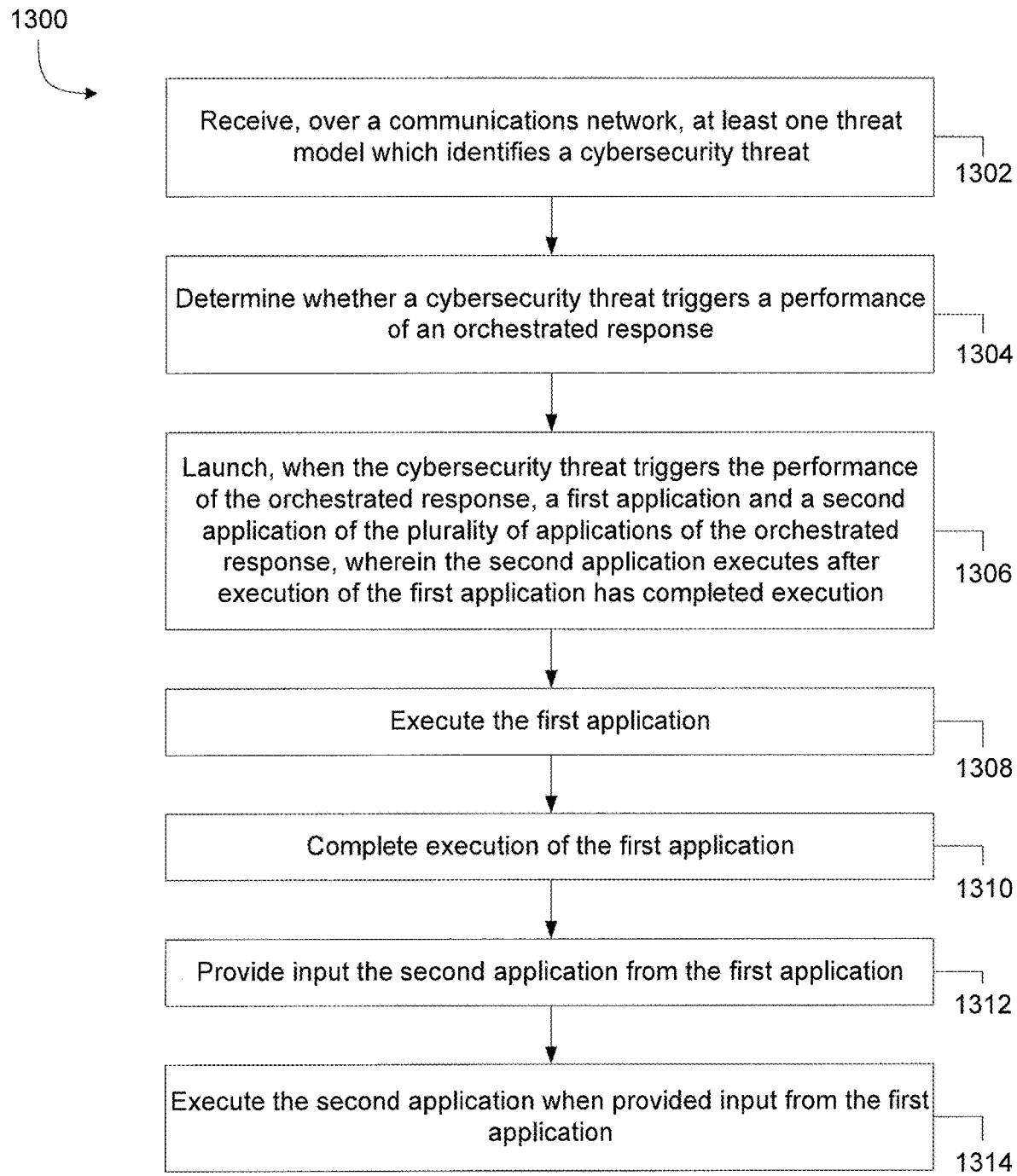
FIG. 13 depicts a flowchart illustrating a method for improve cybersecurity threat responses by launching applications ahead of time, according to implementations discloses herein.

FIG. 13 depicts a flowchart illustrating a method 1300 for improving cybersecurity threat responses by launching applications ahead of time ("AOT"), according to implementations discloses herein. While the methods are shown and described as being a series of acts that are performed in a sequence, it is to be understood and appreciated that the methods are not limited by the order of the sequence. For example, some acts may occur in a different order than what is described herein. In addition, an act may occur concurrently with another act. Further, in some embodiments, not all acts may be required to implement methods described herein.

Moreover, the acts described herein may be computer-executable instructions that may be implemented by one or more processors and/or stored on a non-transitory computer-readable medium or media. The computer-executable instructions may include a routine, a sub-routine, programs, a thread of execution, and/or the like. Still further, results of acts of the methods may be stored in a non-transitory computer-readable medium, displayed on a display device, and/or the like.

Method 1300 may begin at step 1302, where, over a communications network, at least one threat model which identifies a cybersecurity threat may be received. Then, at step 1304, it may be determined whether a cybersecurity threat triggers a performance of an orchestrated response. The orchestrated response, also referred to as a Playbook, may include a plurality of applications to be executed in a predetermined sequence. The predetermined sequence of the plurality of applications may be a network's security plan for analyzing and responding to a particular cybersecurity threat. At step 1306, when the cybersecurity threat triggers the performance of the orchestrated response, a first application and a second application of the plurality of applications of the orchestrated response may be launched. The second application may execute after execution of the first application has completed execution. The second application, after launching, may be placed into a wait state until the first application has completed execution. Then, at step 1308, input may be provided to the second application from the first application. The orchestrated response may continue until all of the plurality of applications are executed or exited.

The launching the plurality of applications of the orchestrated response may include launching the plurality of applications of the orchestrated response within a predetermined depth level based on the predetermined sequence of execution of the plurality of applications. The predetermined depth level may be based on one or more of the plurality of applications of the orchestrated response, an amount of computing resources used by the plurality of applications, and preventing a previous application from completing before a subsequent application launches in the predetermined sequence of execution of the plurality of applications.

The predetermined sequence of execution of the plurality of applications may include a decision in which one of a third application or a fourth application of the plurality of applications executes based on a result of an application that executes before the third application and the fourth application in the predetermined sequence of execution of the plurality of applications. When the application that executes before the third application and the fourth application in the predetermined sequence of execution of the plurality of applications, the one of the third application of the fourth second application may be launched based on the result. Further, the one of the third application or the fourth application that has not launched may be exited based on one of a status command or expiration of a predetermined amount of time.

Figure 14:
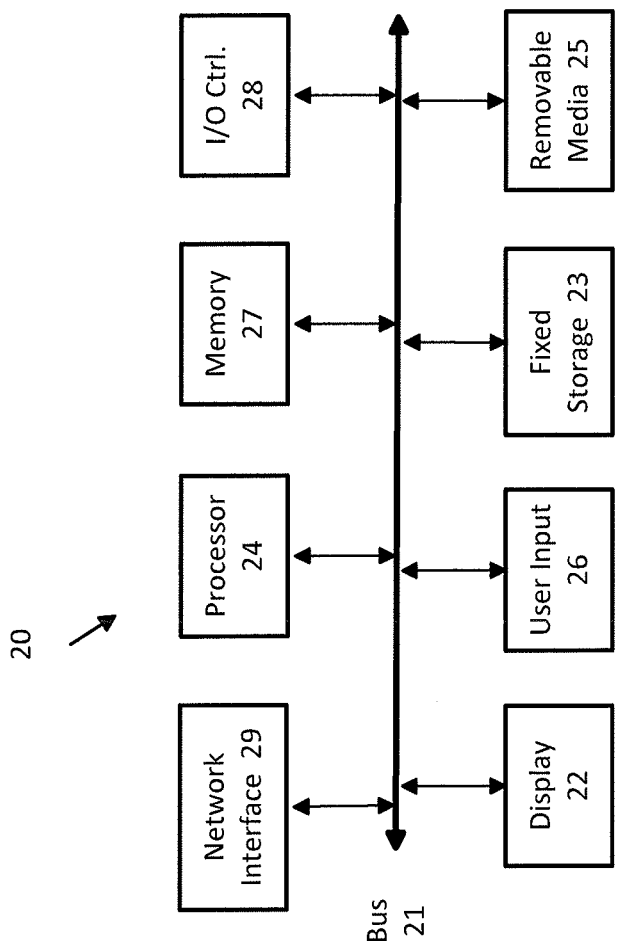
FIG. 14 is an example computer (e.g., server or local computer) suitable for implementing embodiments of the presently disclosed subject matter.

Embodiments of the presently disclosed subject matter may be implemented in and used with a variety of component and network architectures. FIG. 14 is an example computer 20 (e.g., a cloud-based server, server, database, smartphone, tablet, laptop, mobile device, server) suitable for implementing embodiments of the presently disclosed subject matter. The computer 20 can include a bus 21 which interconnects major components of the computer 20, such as a central processor 24, a memory 27 (typically RAM, but which may also include read-only memory ("ROM"), flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include ROM or flash memory (neither shown), and RAM (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25. A server (e.g., a cloud-based server) may be implemented as a cluster of computers 20, each of which may contain some or all of the aforementioned components.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks. Many other devices or components (not shown) may be connected in a similar manner (e.g., digital cameras or speakers). Conversely, all of the components shown in FIG. 14 need not be present to practice the present disclosure. The components can be interconnected in different ways from that shown. The operation of a computer such as that shown in FIG. 14 is readily known in the art and is not discussed in detail in this application. Code to implement the present disclosure can be stored in computer-readable storage media such as one or more of the memory 27, fixed storage 23, removable media 25, or on a remote storage location.

Figure 15:
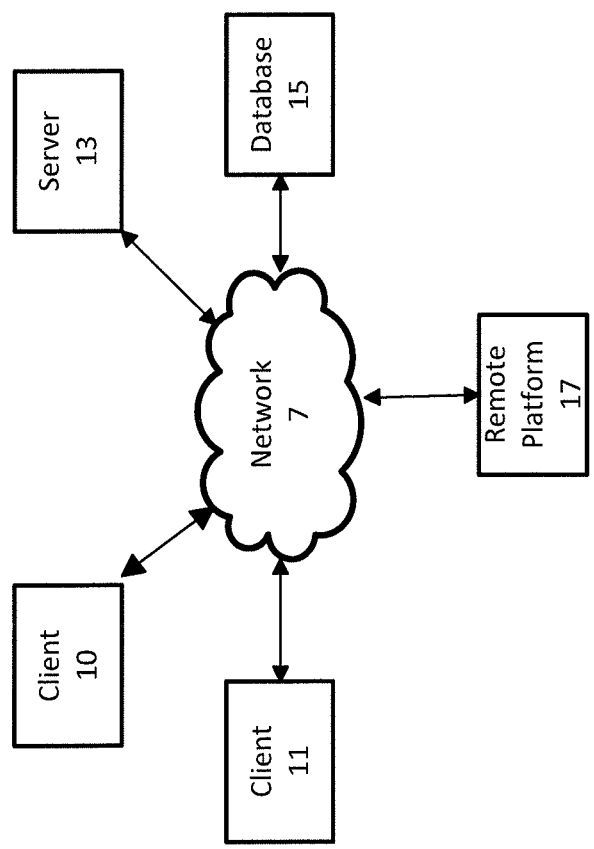
FIG. 15 shows an example network arrangement according to an embodiment of the disclosed subject matter.

FIG. 15 shows an example network arrangement according to an embodiment of the disclosed subject matter. One or more clients 10, 11, such as local computers, mobile devices, smartphones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter.

When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

What is claimed is:

1. A system for improved cybersecurity intelligence by launching applications ahead of time, comprising:
    a non-transitory memory configured to store at least threat model data; and
    one or more hardware processors coupled to the non-transitory memory and configured to read instructions from the non-transitory memory to cause the system to perform operations comprising:
        receiving, over a communications network, at least one threat model;
        determining whether a performance of an orchestrated response is triggered based on the at least one threat model, wherein the orchestrated response includes a plurality of applications to be executed in a predetermined sequence; and
        launching, when the performance of the orchestrated response is triggered, a first application, a second application, and a third application of the plurality of applications of the orchestrated response within a predetermined depth level, wherein the predetermined depth level is based on i) the predetermined sequence of execution of the plurality of applications, ii) an amount of computing resources used by the plurality of applications, and iii) preventing a previous application in the predetermined sequence of execution of the plurality of applications from completing before a subsequent application in the predetermined sequence of execution of the plurality of applications launches, wherein the second application executes after execution of the first application has completed execution, wherein the third application executes after execution of the second application has completed execution, wherein the second application is placed into a wait state until the first application has completed execution, and wherein the third application is placed into a wait state until the first application has completed execution and the second application has completed execution.

2. The system of claim 1, wherein receiving, over the communications network, the at least one threat model includes:
    receiving, over the communications network, the at least one threat model which identifies a cybersecurity threat,
    wherein determining whether the performance of the orchestrated response is triggered based on the at least one threat model includes:
        determining whether the cybersecurity threat triggers the performance of the orchestrated response based on the at least one threat model, and
    wherein launching, when the performance of the orchestrated response is triggered, the first application, the second application, and the third application of the plurality of applications of the orchestrated response includes:
        launching, when the cybersecurity threat triggers the performance of the orchestrated response, the first application, the second application, and the third application of the plurality of applications of the orchestrated response.

3. The system of claim 2, wherein the predetermined sequence of the plurality of applications is a network's security plan for analyzing and responding to the particular cybersecurity threat.

4. The system of claim 1, wherein the predetermined sequence of execution of the plurality of applications includes a decision in which one of a fourth application and a fifth application of the plurality of applications executes based on a result of an application that executes before the fourth application and the fifth application in the predetermined sequence of execution of the plurality of applications.

5. The system of claim 4, further comprising:
    launching, when the application that executes before the fourth application and the fifth application in the predetermined sequence of execution of the plurality of applications, the one of the fourth application or the fifth application based on the result of the application that executes before the fourth application and the fifth application in the predetermined sequence of execution of the plurality of applications.

6. The system of claim 5, further comprising:
    exiting one of the fourth application or the fifth application that has launched, is placed into the wait state, and not executed based on one of a status command or expiration of a predetermined amount of time.

7. The system of claim 1, further comprising:
    providing input to the second application from the first application.

8. A computer-implemented method for improved cybersecurity intelligence by launching applications ahead of time, the method comprising:
    receiving, over a communications network, at least one threat model;
    determining whether a performance of an orchestrated response is triggered based on the at least one threat model, wherein the orchestrated response includes a plurality of applications to be executed in a predetermined sequence; and launching, when the performance of the orchestrated response is triggered, a first application, a second application, and a third application of the plurality of applications of the orchestrated response within a predetermined depth level, wherein the predetermined depth level is based on i) the predetermined sequence of execution of the plurality of applications, ii) an amount of computing resources used by the plurality of applications, and iii) preventing a previous application in the predetermined sequence of execution of the plurality of applications from completing before a subsequent application in the predetermined sequence of execution of the plurality of applications launches, wherein the second application executes after execution of the first application has completed execution, wherein the third application executes after execution of the second application has completed execution, wherein the second application is placed into a wait state until the first application has completed execution, and wherein the third application is placed into a wait state until the first application has completed execution and the second application has completed execution.

9. The method of claim 8, wherein receiving, over the communications network, the at least one threat model includes:

receiving, over the communications network, the at least one threat model which identifies a cybersecurity threat, wherein determining whether the performance of the orchestrated response is triggered based on the at least one threat model includes:

determining whether the cybersecurity threat triggers the performance of the orchestrated response based on the at least one threat model, and wherein launching, when the performance of the orchestrated response is triggered, the first application, the second application, and the third application of the plurality of applications of the orchestrated response includes:

launching, when the cybersecurity threat triggers the performance of the orchestrated response, the first application, the second application, and the third application of the plurality of applications of the orchestrated response.

10. The method of claim 9, wherein the predetermined sequence of the plurality of applications is a network's security plan for analyzing and responding to a particular cybersecurity threat.

11. The method of claim 8, wherein the predetermined sequence of execution of the plurality of applications includes a decision in which one of a fourth application and a fifth application of the plurality of applications executes based on a result of an application that executes before the fourth application and the fifth application in the predetermined sequence of execution of the plurality of applications.

12. A computer-readable storage device storing instructions that, when executed by a computer, cause the computer to perform a method for improved cybersecurity intelligence by launching applications ahead of time, the method including:

receiving, over a communications network, at least one threat model;

determining whether a performance of an orchestrated response is triggered based on the at least one threat model, wherein the orchestrated response includes a plurality of applications to be executed in a predetermined sequence; and launching, when the performance of the orchestrated response is triggered, a first application, a second application, and a third application of the plurality of applications of the orchestrated response within a predetermined depth level, wherein the predetermined depth level is based on i) the predetermined sequence of execution of the plurality of applications, ii) an amount of computing resources used by the plurality of applications, and iii) preventing a previous application in the predetermined sequence of execution of the plurality of applications from completing before a subsequent application in the predetermined sequence of execution of the plurality of applications launches, wherein the second application executes after execution of the first application has completed execution, wherein the third application executes after execution of the second application has completed execution, wherein the second application is placed into a wait state until the first application has completed execution, and wherein the third application is placed into a wait state until the first application has completed execution and the second application has completed execution.

13. The computer-readable storage device according to claim 12, wherein receiving, over the communications network, the at least one threat model includes:

receiving, over the communications network, the at least one threat model which identifies a cybersecurity threat, wherein determining whether the performance of the orchestrated response is triggered based on the at least one threat model includes:

determining whether the cybersecurity threat triggers the performance of the orchestrated response based on the at least one threat model, and wherein launching, when the performance of the orchestrated response is triggered, the first application, the second application, and the third application of the plurality of applications of the orchestrated response includes:

launching, when the cybersecurity threat triggers the performance of the orchestrated response, the first application, the second application, and the third application of the plurality of applications of the orchestrated response.

14. The computer-readable storage device according to claim 13, wherein the predetermined sequence of the plurality of applications is a network's security plan for analyzing and responding to a particular cybersecurity threat.

15. The method of claim 11, further comprising:

launching, when the application that executes before the fourth application and the fifth application in the predetermined sequence of execution of the plurality of applications, the one of the fourth application or the fifth application based on the result of the application that executes before the fourth application and the fifth application in the predetermined sequence of execution of the plurality of applications.

16. The method of claim 15, further comprising:

exiting one of the fourth application or the fifth application that has launched, is placed into the wait state, and not executed based on one of a status command or expiration of a predetermined amount of time.

17. The method of claim 8, further comprising:
 providing input to the second application from the first application.

18. The computer-readable storage device according to claim 12, wherein the predetermined sequence of execution of the plurality of applications includes a decision in which one of a fourth application and a fifth application of the plurality of applications executes based on a result of an application that executes before the fourth application and the fifth application in the predetermined sequence of execution of the plurality of applications.

19. The computer-readable storage device according to claim 18, wherein the instructions that, when executed by the computer, cause the computer to perform the method for improved cybersecurity intelligence by launching applications ahead of time, the method further including:
 launching, when the application that executes before the fourth application and the fifth application in the predetermined sequence of execution of the plurality of applications, the one of the fourth application or the fifth application based on the result of the application that executes before the fourth application and the fifth application in the predetermined sequence of execution of the plurality of applications.

20. The computer-readable storage device according to claim 19, wherein the instructions that, when executed by the computer, cause the computer to perform the method for improved cybersecurity intelligence by launching applications ahead of time, the method further including:
 exiting one of the fourth application or the fifth application that has launched, is placed into the wait state, and not executed based on one of a status command or expiration of a predetermined amount of time.

* * * * *